Oct. 18, 1927.  
J. A. CRAWFORD  
COFFEE PERCOLATOR  
Filed July 27, 1926
1,645,896
2 Sheets-Sheet 1
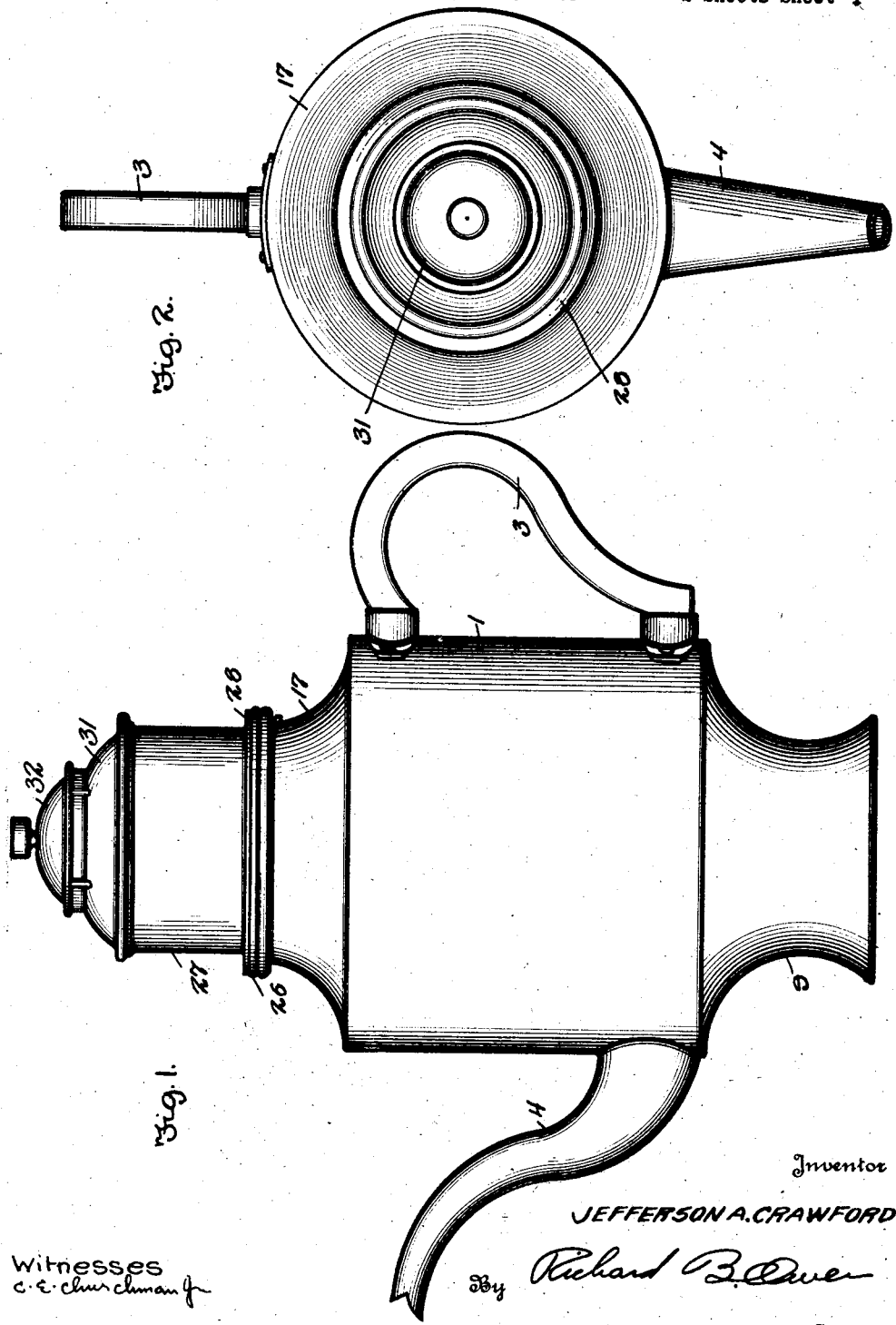
Inventor  
JEFFERSON A. CRAWFORD  
By Richard B. Owen  
Attorney
Witnesses  
C. E. Churchman Jr.

Oct. 18, 1927.
J. A. CRAWFORD
1,645,896
COFFEE PERCOLATOR
Filed July 27, 1926
2 Sheets-Sheet 2
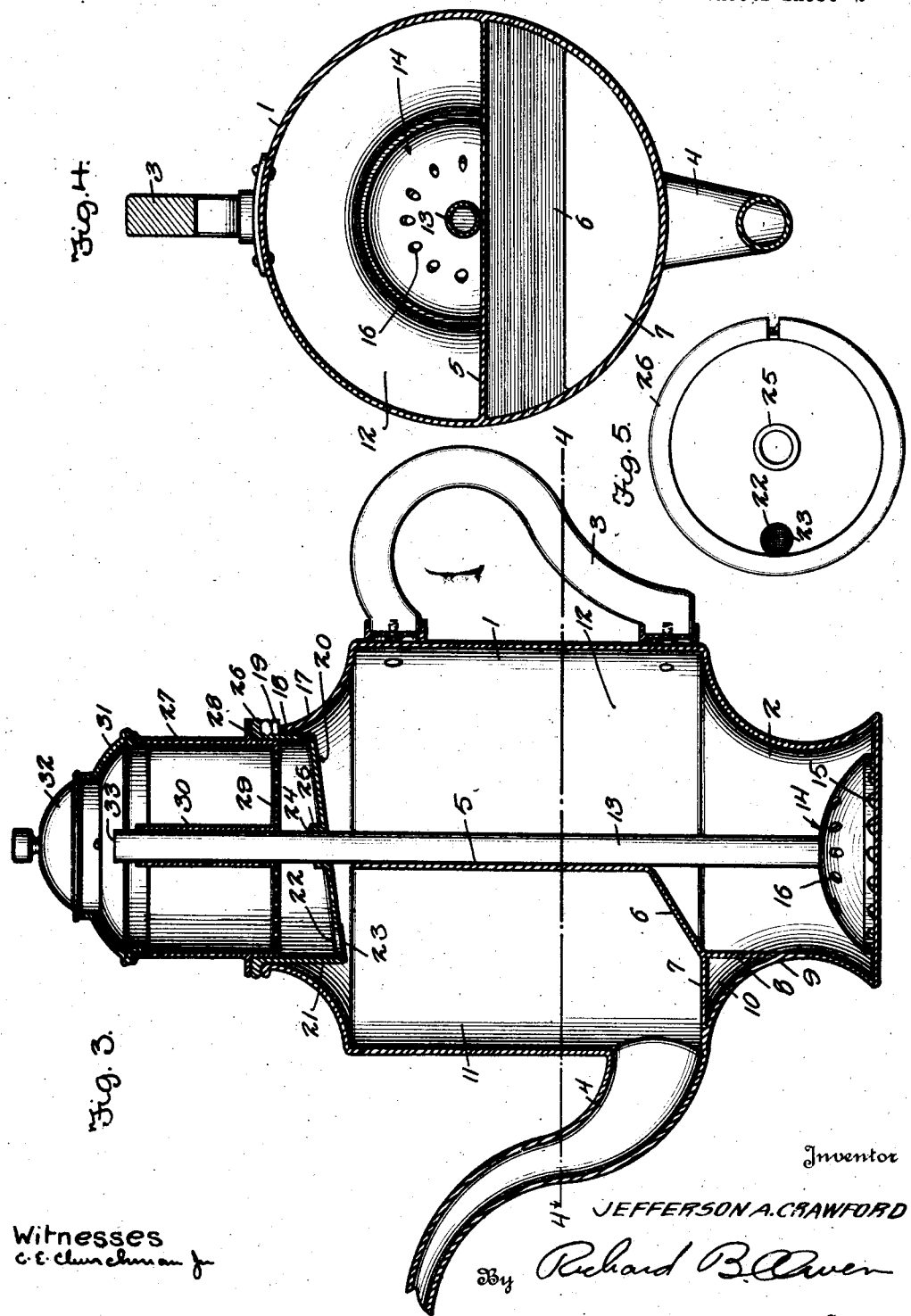
Witnesses
Inventor
JEFFERSON A. CRAWFORD
Attorney Patented Oct. 18, 1927.

1,645,896

UNITED STATES PATENT OFFICE.

JEFFERSON A. CRAWFORD, OF LAKE CHARLES, LOUISIANA.

COFFEE PERCOLATOR.

Application filed July 27, 1926. Serial No. 125,299.

This invention relates to coffee percolators and has for its object the production of a simple and efficient percolator, which is provided with two compartments, one of which compartments is adapted to receive the percolated coffee and contain the same to prevent the coffee from boiling after the coffee has once percolated.

Another object of this invention is the production of a simple and efficient coffee percolator, which is so constructed as to cause the percolated coffee to be drained to a compartment separated from the boiling water contained within the percolator, whereby the percolated coffee will be kept warm, but, at the same time, will be prevented from boiling.

With these and other objects in view, this invention consists of certain novel constructions, combinations and arrangements of parts, as will be hereinafter described and claimed.

In the drawings:

Figure 1 is a side elevation of the coffee pot.

Figure 2 is a top plan view of the coffee pot or percolator.

Figure 3 is a vertical sectional view through the coffee pot or percolator.

Figure 4 is a section taken on line 4—4 of Figure 3.

Figure 5 is a top plan view of the shunt pan.

In the particular structure illustrated in the drawings, 1 designates the body of the coffee pot which is provided with a reduced base 2, a handle 3 of suitable or desired design and a spout 4. The body 1 is provided with a substantially centrally located vertically extending partition 5, which terminates at its lower end in a forwardly inclined partition or flared bottom 6 which engages at its bottom end a bottom plate 7. This bottom plate 7 is braced by means of a vertically extending wall 8, extending at right angles thereto, this vertically extending wall 8 engaging the side walls of the base 2 at the point indicated at 9, the base 2 being curved outwardly to merge into the contour of the spout 4, as shown clearly in Figure 2. This vertically extending wall 8, as well as the base plate 7 and the outer wall of the base 2 will produce a dead air space or pocket 10 just below the inner end of the spout 4 and at the bottom of the coffee containing compartment 11. This vertically extending partition 5, as well as the inclined partition or bottom 6 will constitute a dividing wall for separating the coffee containing compartment 11 from the water containing compartment 12 clearly illustrated in Figure 3.

A vertically extending hollow tubular water spout or stem 13 is adapted to extend substantially vertically through the body 1 of the coffee pot, and rest against the vertically extending dividing wall 5, as shown in Figure 3, and this tube or spout 13 carries at its lower end a substantially semi-spherical base plate 14 which is provided with a scalloped lower edge 15 and a plurality of apertures 16 formed therein to permit the free circulation of water under and through this semi-spherical base 14.

The body 1 of the coffee pot is provided with a reduced neck 17 at its upper end, which reduced neck is provided with a notch 18 formed therein upon the rear thereof, for the purpose of receiving an anchoring peg 19 which is carried by the shunt pan 20 clearly illustrated in Figure 3. This shunt pan 20 comprises a comparatively shallow circular pan structure having the bottom thereof inclined toward the forward end 21. A drain aperture 22 is formed near the forward end of the shunt pan 20 as shown clearly in Figure 3 and is provided with a strainer disk 23 for the purpose of straining the liquid as the same passes through the aperture 22. The shunt pan 20 is provided with a centrally located aperture 24 which is provided with up-turned edges 25 constituting a substantially circular flange for fitting snugly around the vertically extending tube 13 and constituting a seal for preventing the percolated coffee from dripping down the vertically extending tube 13. The peg 19, by fitting within the notch 18, will constitute an efficient means for anchoring the shunt pan 20 in its proper position so as to cause the aperture 22 to extend over the coffee receiving compartment 11. This shunt pan 20 is provided with an overhanging flange 26 for the purpose of supporting the shunt pan in the reduced neck 17 of the body 1 of the coffee pot and constitute an efficient support for the pan 20.

A dripper cup 27 is adapted to have its lower end seated within the upper end of the shunt pan 20 as clearly illustrated in Figure 3 and this dripper cup 27 is provided with a laterally extending flange 28 which overhangs the flange 26 of the shunt pan 20 and constitutes a support for the dripper cup 27. This dripper cup 27 is provided with a perforated bottom 29, and a vertically extending hollow sleeve 30 which sleeve 30 is adapted to snugly fit around and over the upper end of the vertically extending tube or spout 13. A cap 31 of suitable design is adapted to fit over the upper end of the dripper cup 27 and the usual glass cap 32 is carried by the cover 31.

It should be understood that the coffee is placed within the drip cup in a ground condition, and a suitable quantity of water is placed within the compartment 12 of the body 1 of the coffee pot. As the water boils, the same will pass up through the tube 13 and out through the upper end 32 thereof against the upper end 33 thereof against the under face of the cap 32 in the usual manner and there be spread and dropped upon the ground coffee within the drip cup 27. The water will then percolate through the ground coffee and the percolated liquid will pass out through the perforated bottom 29 into the shunt pan 20. This percolated coffee will then pass down through the aperture 22, through the strainer 23, into the coffee containing compartment 11. The coffee will then be contained or held within the compartment 11 against boiling, but the boiling water within the compartment 12 will keep the percolated liquid within the compartment 11 at a suitable or desired temperature. This arrangement of the coffee pot will prevent the escape of the aroma from the coffee made and does not permit the percolated coffee to continuously boil, but, on the other hand, will maintain the coffee within the compartment 11 at a sufficient temperature to suit the desire of the user and be at all times ready to serve when wanted. The location of the dead air space 10 in the front of the coffee pot under the compartment 11 will assist in preventing the coffee within the compartment 11 from boiling.

It should be understood that certain detail changes in mechanical construction may be employed in the present invention without departing from the spirit thereof and that the particular design or shape of the coffee pot may be changed to suit the desire of the user, without departing from the spirit of the invention.

It is a well known fact that by repeatedly boiling the coffee and causing the water to continually percolate through the ground coffee and drip back into the same boiling water, the coffee will produce a cooked smell and taste, due largely to the fact that the continuous boiling of the water over the ground coffee, will lose its proper taste.

Having described the invention, what is claimed is:

1. A coffee pot of the class described comprising a body having a substantially centrally located vertically extending partition and an inclined bottom for dividing the body into a boiling water containing compartment, and a percolated liquid containing compartment, a shunt pan removably carried by the top of said body and provided with means at one end for delivering percolated liquid to said percolated liquid containing compartment, and coffee percolating means carried by said body.

2. A coffee percolator of the class described, comprising a body, having a compartment formed therein for containing boiled water, said body also provided with a second compartment adapted to receive percolated liquid, the body provided with a reduced upper end, a shunt pan having an inclined bottom fitted within said upper end of said body, means for anchoring said shunt pan upon the upper end of said body in a proper position for causing the lower end of said pan to extend over the percolated liquid containing compartment, said shunt pan provided with a discharge aperture at its lower end, a screen extending over said aperture for draining the liquid passing from the shunt pan into the percolated liquid containing compartment, a dripper cup seated within said shunt pan and adapted to feed percolated liquid into the shunt pan, a percolating tube extending vertically through said body and through said dripper cup and adapted to deliver boiled water to the upper end of said dripper cup.

3. A percolator of the class described comprising a body having a partition extending vertically thereof, said partition provided with an inclined bottom, said body provided with a dead air space near the bottom of said partition, the bottom of said partition as well as said vertically extending partition separating the body into a boiling water containing compartment and a percolated liquid containing compartment, percolating means carried by the body, a shunt pan carried by the upper end of said body, said shunt pan provided with a vertically extending collar centrally located, a percolating tube extending through said collar and said shunt pan provided with a discharge means for delivering percolated liquid to said percolated liquid containing compartment.

In testimony whereof I affix my signature.

JEFFERSON A. CRAWFORD.